(12) United States Patent
McAfee

(10) Patent No.: US 12,550,861 B1
(45) Date of Patent: Feb. 17, 2026

(54) DOG WASTE COLLECTION SYSTEM

(71) Applicant: Lance S. McAfee, Kingman, AZ (US)

(72) Inventor: Lance S. McAfee, Kingman, AZ (US)

( * ) Notice: Subject to any disclaimer, the term of this patent is extended or adjusted under 35 U.S.C. 154(b) by 0 days.

(21) Appl. No.: 19/038,473

(22) Filed: Jan. 27, 2025

Related U.S. Application Data

(60) Provisional application No. 63/625,246, filed on Jan. 25, 2024.

(51) Int. Cl.
*A01K 1/00* (2006.01)

(52) U.S. Cl.
CPC .......... *A01K 1/00* (2013.01); *A47L 2201/022* (2013.01); *A47L 2201/06* (2013.01)

(58) Field of Classification Search
CPC .......... A01K 1/00; A01K 1/01; A01K 1/0128; A01K 1/0132
See application file for complete search history.

(56) References Cited

U.S. PATENT DOCUMENTS

| | | |
|---|---|---|
| 3,771,491 A | 11/1973 | Hunter |
| 9,359,732 B2 | 6/2016 | Reynolds |
| 2004/0119304 A1 | 6/2004 | Iso et al. |
| 2009/0250012 A1 | 10/2009 | Greene et al. |
| 2010/0293741 A1 | 11/2010 | Ferris |
| 2012/0080894 A1 | 4/2012 | Williamson |
| 2016/0128304 A1 | 5/2016 | Vanier |
| 2022/0235527 A1 | 7/2022 | Robichaux et al. |
| 2023/0124073 A1 | 4/2023 | Schwichtenberg et al. |

FOREIGN PATENT DOCUMENTS

| | | | |
|---|---|---|---|
| DE | 202005009487 U1 | 9/2005 | |
| WO | WO-2016023716 A1 * | 2/2016 | ............... A01K 1/01 |

OTHER PUBLICATIONS

Animal Waste Collection (Year: 2016).*
Vacuum cleaner for removal of dog excrement has motor operated fan which sucks excrement up tube into removable air-permeable bag which fills tube completely. Patent Translation [online]. Google Patents [retrieved on Aug. 14, 2023]. Retrieved from the Internet: <URL: Vacuum cleaner for removal of dog excrement has motor operated fan which sucks excrement up tube into removable air-permeable bag which fills tube completely>.

* cited by examiner

*Primary Examiner* — Christopher D Hutchens
*Assistant Examiner* — Nevena Aleksic
(74) *Attorney, Agent, or Firm* — Cramer Patent & Design, PLLC.; Aaron R. Cramer

(57) ABSTRACT

A pet dropping retrieval and disposal device has a mobile unit and a base unit for automatic collection and disposal of pet droppings. The mobile unit navigates a yard area using a dual track drive system and a GPS receiver to locate droppings via a machine vision system camera and a methane sensor. The collected droppings are transferred to a temporary hopper via a conveyor belt and analyzed by a health sensor for potential health concerns. The base unit provides recharging via a charging port, facilitates disposal into a holding bin, and allows user control through a local control panel. The device communicates telemetry data via a telemetry RF signal to a wireless device for remote monitoring.

9 Claims, 5 Drawing Sheets

DOG WASTE COLLECTION SYSTEM

RELATED APPLICATIONS

The present device was first described in and is a continuation of U.S. Provisional Application No. 63/625,246, filed Jan. 25, 2024, the entire disclosures of which are incorporated herein by reference.

FIELD OF THE INVENTION

The present invention relates generally to automated pet waste management systems and, more particularly, to a pet dropping retrieval and disposal device that autonomously detects, collects, and disposes of pet waste in outdoor environments using advanced sensing, tracking, and communication technologies.

BACKGROUND OF THE INVENTION

Proper disposal of pet waste is essential for maintaining hygiene and preventing the spread of diseases in residential and public areas. Traditional methods of manually picking up pet waste can be inconvenient, time-consuming, and prone to oversight, leading to unsanitary conditions. Existing solutions such as manual scoops and disposable bags require constant user intervention and may not be effective in larger outdoor spaces or for pet owners with limited mobility. Furthermore, pet waste can pose environmental risks if not properly managed, contributing to pollution and health hazards. There is a need for an automated solution that can efficiently track, detect, collect, and dispose of pet droppings with minimal user intervention while providing real-time monitoring and health analysis. The present invention addresses these challenges by introducing a comprehensive pet waste management system that leverages GPS tracking, machine vision, methane sensing, and wireless communication to autonomously manage pet waste in various outdoor environments.

SUMMARY OF THE INVENTION

Embodiments of the present disclosure may include a pet dropping retrieval and disposal device comprising a mobile unit configured to navigate a yard area, with the mobile unit including a dual track drive system for locomotion. Embodiments may also include a first GPS receiver configured to receive location data from a GPS satellite array.

Embodiments may further include a collar receiver configured to communicate with a collar transmitter worn by a pet to track the pet's location. Additionally, embodiments may include a machine vision system camera for visual detection of pet droppings and a methane sensor for detecting methane gas emanating from the droppings.

Embodiments may also include an ambient air temperature sensor and a moisture sensor for determining the drying conditions of pet droppings. A scoop may be configured to collect the droppings, and a conveyor belt may transfer the collected droppings to a temporary hopper. An audible alert may be included to deter the pet from interfering with the retrieval process.

To analyze collected droppings for potential health concerns, embodiments may include a health sensor. A rechargeable battery may be provided to power the mobile unit, with a charging port included for recharging the battery. A waterproof barrier may be used to protect the internal electronic components.

Embodiments may also include a base unit configured to communicate with the mobile unit. The base unit may include a second GPS receiver and a second telemetry transmitter for communication with the mobile unit. A ramp may be provided to allow the mobile unit to ascend and empty the temporary hopper into a holding bin. The base unit may further include a power cord and power supply for powering the base unit and recharging the mobile unit's battery, as well as a local control panel for manual operation of the device.

In some embodiments, the mobile unit may include a second microcontroller configured to process input signals from the methane sensor, machine vision system camera, ambient air temperature sensor, moisture sensor, and health sensor to determine the location and drying status of the droppings. The mobile unit may also be configured to operate in a "walk-along" mode, in which it immediately collects droppings using the scoop and temporary hopper while the user walks the pet.

In some embodiments, the health sensor may detect pathogens such as Campylobacteriosis, *Salmonella*, *E. coli*, and *Giardia*, and transmit the results to a wireless device via telemetry signals. The base unit may include a holding bin for collected droppings, which can be periodically emptied by a user. The device may also be operable via a wireless device configured to receive real-time telemetry data from the base unit.

In some embodiments, the mobile unit may be shaped to resemble a pet, with its size being adjustable for compatibility with different pet sizes. The waterproof barrier may be removable to facilitate cleaning of the mobile unit. Additionally, the pet dropping retrieval and disposal device may include a charge controller within the base unit, configured to regulate power delivery to the mobile unit's rechargeable battery.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
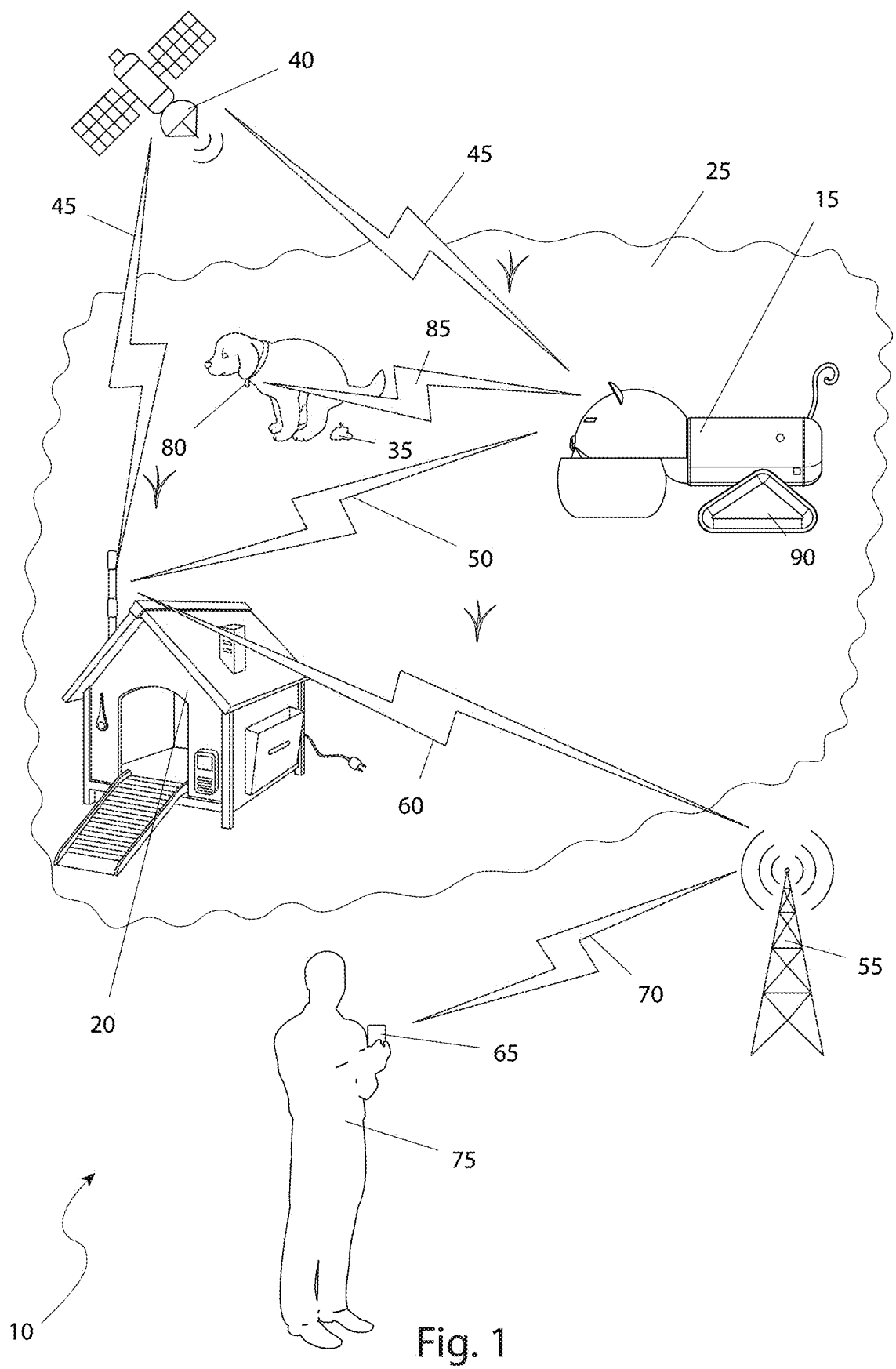
FIG. 1 is an environmental view of a pet dropping retrieval and disposal device 10, according to the preferred embodiment of the present invention.

DESCRIPTIVE KEY 10 pet dropping retrieval and disposal device
15 mobile unit
20 base unit
25 yard area 30 pet
35 droppings
40 Global Positioning System (GPS) satellite array
45 GPS RF signal
50 telemetry RF signal
55 land-based transmitter
60 first land-based RF signal
65 wireless device
70 second land-based RF signal
75 user
80 collar transmitter
85 collar RF signal
90 dual track drive system
95 first GPS receiver
100 collar receiver
105 machine vision system camera
110 methane sensor
115 ambient air temperature
120 moisture sensor
125 scoop
130 temporary hopper
135 conveyor belt
140 audible alert
145 charging port
150 rechargeable battery
155 health sensor
158 power cord
160 ramp
165 holding bin
170 second GPS receiver
175 second telemetry transmitter
180 local control panel
185 power supply
190 first microcontroller
195 charge controller
200 second microcontroller
205 waterproof barrier 1. Description of the Invention The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

2. Detailed Description of the Figures

Referring now to FIG. 1, an environmental view of a pet dropping retrieval and disposal device 10, according to the preferred embodiment of the present invention is disclosed.

The pet dropping retrieval and disposal device (herein also described as the "device") 10, provides for the automatic collection and disposal of droppings 35 from a pet 30. The device 10 includes two (2) primary components, a mobile unit 15 and a base unit 20, both of which are located in a yard area 25 such as a backyard, park, green space, or the like. Also included in the yard area 25 is a pet 30, herein depicted as a dog for purposes of illustration. It is also envisioned that the mobile unit 15 may be used in a "walk-along" mode in which it is used when walking the pet 30 in areas outside of the yard area 25. The "walk-along" mode would be utilized in neighborhood walks, pet parks, while camping or hiking, at homes of family or friends, when on vacation, or anywhere outside of the yard area 25. The pet 30 is envisioned at one (1) point in time to produce droppings 35 that is collected, transported, and disposed by the device 10. Further detail on the configuration and operation of the mobile unit 15 and the base unit 20 will be provided herein below.

Location information needed for operation of the device 10 is provided by the Global Positioning System (GPS) satellite array 40 to mobile unit 15 and the base unit 20 via multiple GPS RF signal 45. Telemetry information, described in greater detail herein below, is provided by a telemetry RF signal 50 between the mobile unit 15 and the base unit 20. Information regarding the usage and operation of the device 10 is provided from the base unit 20 to a land-based transmitter 55, such as a cellular tower via a first land-based RF signal 60 to a wireless device 65, envisioned to be a personal electronic device, tablet or other such computing device via a second land-based RF signal 70. The wireless device 65 would be utilized by an authorized user 75 such as a pet owner or care provider, who may be located anywhere within the coverage range of the second land-based RF signal 70, envisioned to be anywhere in the world in the case of a cellular system. A collar transmitter 80, worn by the pet 30, provides relative location information to the mobile unit 15, via a collar RF signal 85.

Figure 2:
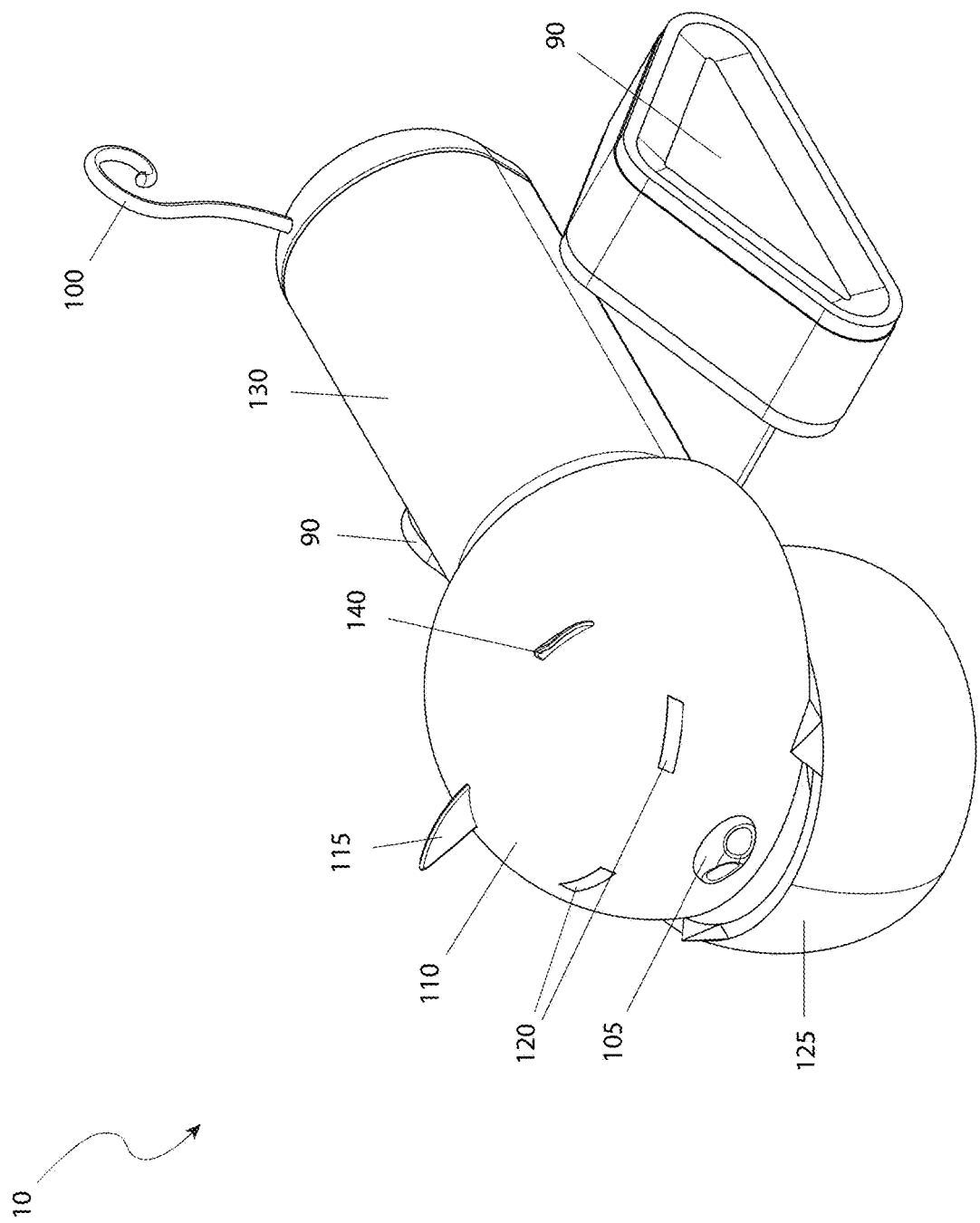
FIG. 2 is a perspective view of a mobile unit 15 as used with the pet dropping retrieval and disposal device 10, according to the preferred embodiment of the present invention.
Figure 3:
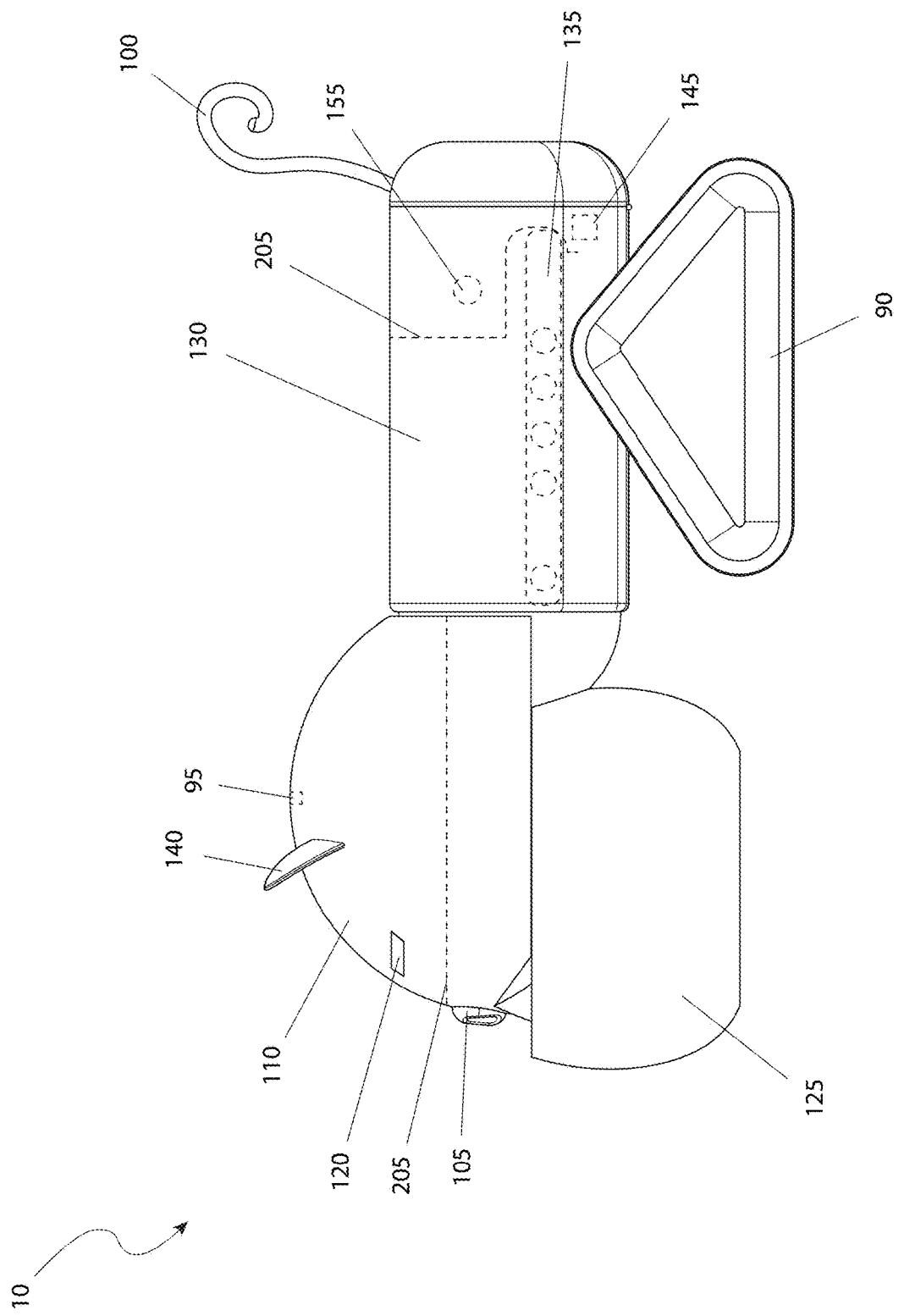
FIG. 3 is a side elevation and partial cross-sectional view of the mobile unit 15 as used with the pet dropping retrieval and disposal device 10, according to the preferred embodiment of the present invention.

Referring next to FIGS. 2 and 3, various views of the mobile unit 15 as used with the device 10, according to the preferred embodiment of the present invention is depicted. The mobile unit 15 is provided with the overall relative appearance of a pet 30 such as a dog, as shown. The mobile unit 15 would be made available in multiple sizes for use with different sized pets. However, for purposes of illustration, a typical size mobile unit 15 for a medium sized pet 30, would be approximately eighteen inches (18 in.) by twenty-two inches (22 in.) by twenty-four inches (24 in.). The bottom of the mobile unit 15 is equipped with a collar RF signal 85 that allows for locomotion of the mobile unit 15 around the yard area 25 (as shown in FIG. 1). The mobile unit 15 is provided with a dual track drive system 90 to receive location signals from the Global Positioning System (GPS) satellite array 40 (as shown in FIG. 1). A first GPS receiver 95 is provided for communication with the base unit 20 (as shown in FIG. 1). A collar receiver 100 is provided for communicating with the collar transmitter 80 (as shown in FIG. 1) to determine the location of the pet 30 (as shown in FIG. 1).

To further aid in location of the pet 30, a machine vision system camera 105 is provided on the front of the mobile unit 15. To aid in the determination of the actual droppings 35 (as shown in FIG. 1), the mobile unit 15 is provided with a methane sensor 110 to detect methane gas emanating from the droppings 35. Once detected, the location of the droppings 35 is recorded via the second microcontroller 200. An internal timer is activated and based upon additional parameters from an ambient air temperature 115 and a moisture sensor 120, a determination of when the droppings 35 are sufficiently dried out, is determined, and a return trip to the droppings 35 is initialized. Then, the mobile unit 15 is equipped with a scoop 125 that picks up the droppings 35 and transfers them to a temporary hopper 130 via a conveyor belt 135. An audible alert 140 is provided to keep any pet 30 away during the retrieval process of the droppings 35. A charging port 145 is provided to recharge the rechargeable battery 150 (not shown in this figure due to illustrative limitations). Recharging will be accomplished when the mobile unit 15 is within the base unit 20 (as shown in FIG. 1). The mobile unit 15 is provided with a health sensor 155 that scans the collected droppings 35 for possible health concerns such as Campylobacteriosis, *Salmonella*, *E. coli*, Parasite (worms), Cryptosporidiosis, Coccidia, *Giardia*, Parvovirus, and the like. The positive detection of such diseases would be transmitted via the telemetry RF signal 50 to the base unit 20 and subsequently to the wireless device 65 (as shown in FIG. 1) for action by the user 75 (as shown in FIG. 1). All of the various electronics inside of the mobile unit 15 are enclosed in a protective waterproof barrier 205 to allow for protection against contamination from the droppings 35, as well as to all for periodic cleaning and/or rinsing of the mobile unit 15 and associated interior. The protective waterproof barrier 25 is depicted herein via dashed lines.

Figure 4:
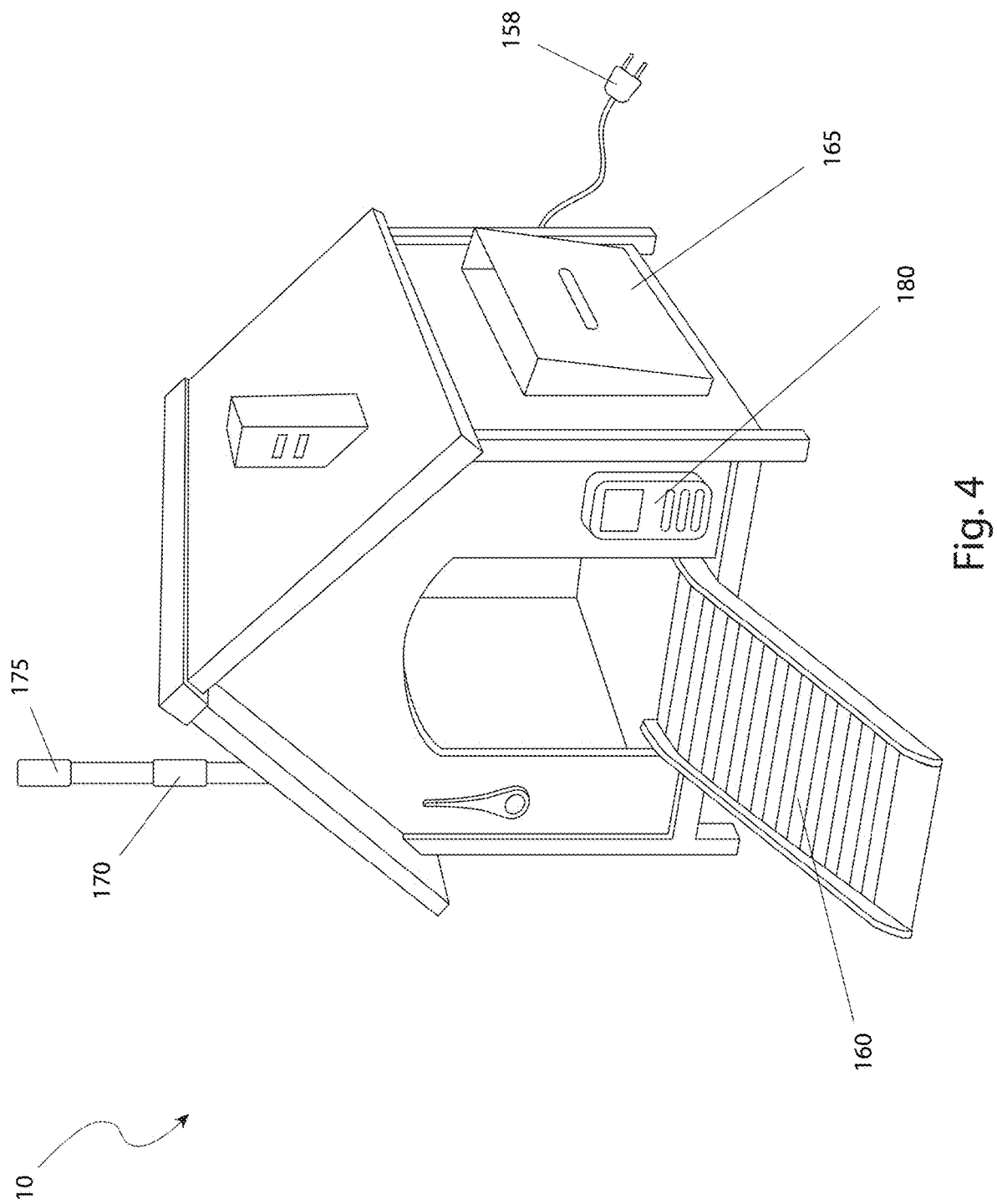
FIG. 4 is a perspective view of a base unit 20 as used with the pet dropping retrieval and disposal device 10, according to the preferred embodiment of the present invention; and, FIG. 5 is an electrical block diagram of the pet dropping retrieval and disposal device 10, according to the preferred embodiment of the present invention.

Referring now to FIG. 4, a perspective view of the base unit 20, as used with the device 10 according to the preferred embodiment of the present invention is shown. The base unit 20 is provided with the overall relative appearance of a house, such as a dog house, as shown. As with the mobile unit 15, the base unit 20 would be provided in different sizes, to accommodate different sizes of pets 30, and to accommodate storage of the mobile unit 15 (as shown in FIGS. 1 through 3). For purposes of illustration, a typical size base unit 20 for a medium size pet 30 would be approximately two feet by three feet by two and one-half feet (2×3×2½ ft.). The base unit 20 receives electrical power from a power cord 158, which not only operated electrical components in the base unit 20, but also charges the mobile unit 15, through the charging port 145 (as shown in FIG. 2). A ramp 160 allows for the mobile unit 15 to enter and exit the base unit 20 for purposes of emptying the temporary hopper 130 (as shown in FIG. 3) into a holding bin 165 for emptying by the user 75 (as shown in FIG. 1). A second GPS receiver 170 and a second telemetry transmitter 175 are provided to communicate with both the Global Positioning System (GPS) satellite array 40 (as shown in FIG. 1) as well as the mobile unit 15. A local control panel 180 is provided to allow for local control of both the mobile unit 15 and the base unit 20 should a wireless device 65 (as shown in FIG. 1) not be available.

Figure 5:
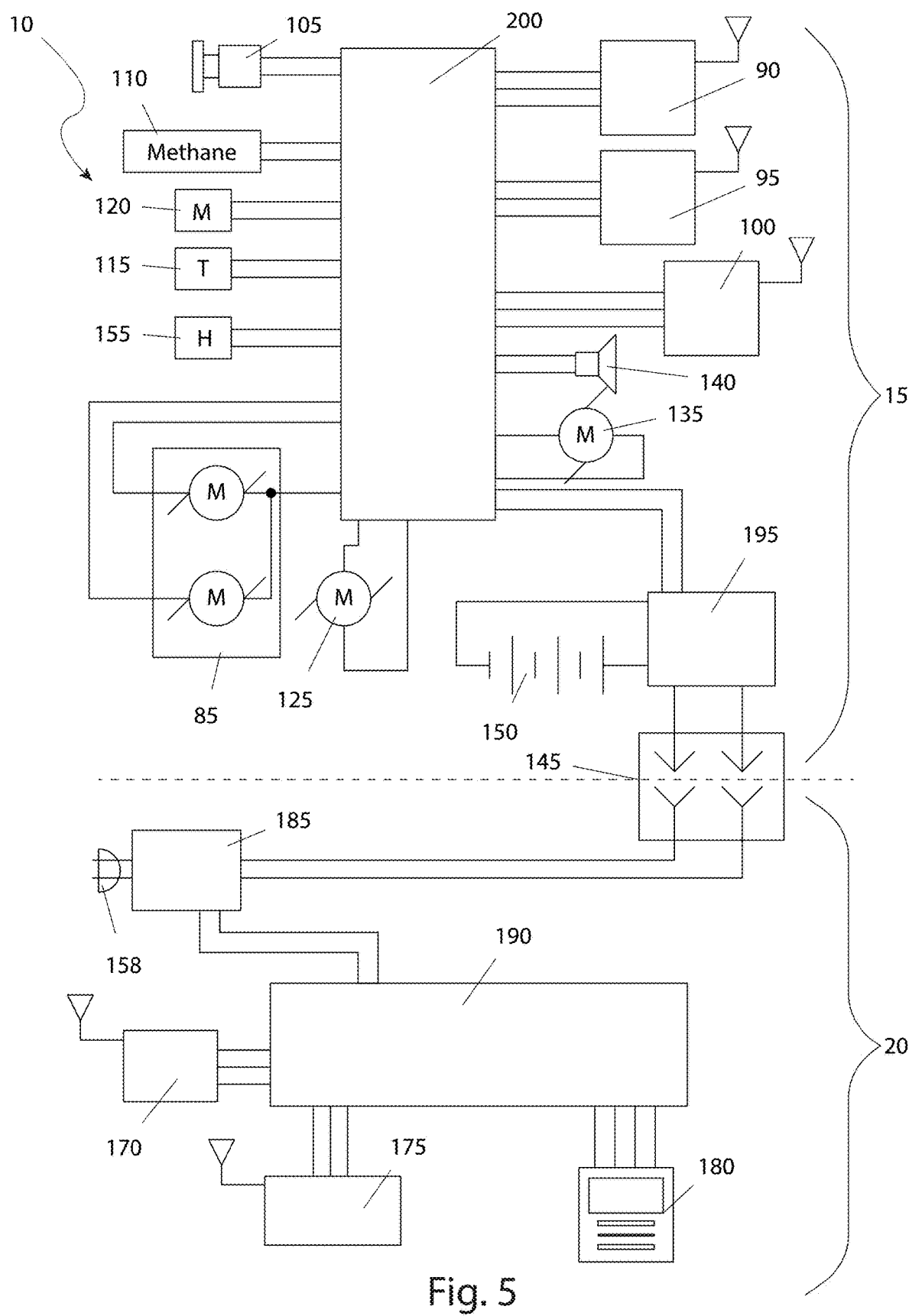

Referring next to FIG. 5, an electrical block diagram of the device 10, according to the preferred embodiment of the present invention is disclosed. Electrical power for the device 10 is derived at the base unit 20 and delivered to a power supply 185. Power is then subsequently delivered to the mobile unit 15 via the charging port 145. Regulated power from the power supply 185 is also delivered to a first microcontroller 190, envisioned to be a single board computer (SBC) such as an Arduino®, RasberryPi®, or the like. Input/output functionality is provided to the second GPS receiver 170, the second telemetry transmitter 175 and the power supply 185. Power from the charging port 145 is delivered to a charge controller 195 which ensures the rechargeable battery 150 is kept charged when the mobile unit 15 is located inside of the base unit 20. Resultant power, either from the charging port 145 or the rechargeable battery 150 is then delivered to a second microcontroller 200 once again envisioned to be a single board computer (SBC) such as an Arduino®, RasberryPi®, or the like. The second microcontroller 200 receives input signals from the machine vision system camera 105, the methane sensor 110, the moisture sensor 120, the ambient air temperature 115, and the health sensor 155. Movement and locomotion are accomplished by output signals to motors contained withing the collar RF signal 85, the scoop 125 and the conveyor belt 135. The motors can be reversed by changing polarity of the signals from the second microcontroller 200. The two (2) motors contained with the collar RF signal 85 allow for turning, as well as forward and backward motion. Output functionality is also delivered. The dual track drive system 90 and the collar receiver 100 provide input signals to the second microcontroller 200 while the first GPS receiver 95 is provided with both input and output functionality. The first microcontroller 190 and the second microcontroller 200 are envisioned to run dedicated software to allow for actuation, usage, and control as aforementioned described.

In another embodiment of the pet dropping retrieval and disposal device 10, the device consists of all the elements described in the specification, ensuring comprehensive functionality and reliability. Specifically, the device 10 includes a mobile unit 15 and a base unit 20, operating within a designated yard area 25 to collect pet 30 droppings 35. The device relies on a Global Positioning System (GPS) satellite array 40, which communicates location data via GPS RF signals 45, enabling precise navigation of the mobile unit 15. Telemetry data is transmitted through a telemetry RF signal 50 between the mobile and base units. The base unit 20 communicates with a land-based transmitter 55 through a first land-based RF signal 60, which transmits data to a wireless device 65 via a second land-based RF signal 70, enabling remote monitoring by a user 75. The pet 30 wears a collar transmitter 80 that transmits a collar RF signal 85 to the mobile unit 15, assisting in tracking the pet's location. The mobile unit 15 is equipped with a dual track drive system 90, a first GPS receiver 95, a collar receiver 100, a machine vision system camera 105, a methane sensor 110, an ambient air temperature sensor 115, and a moisture sensor 120 to facilitate efficient detection and collection of droppings 35. Collected waste is stored in a temporary hopper 130, transported by a conveyor belt 135, and ultimately deposited into a holding bin 165 within the base unit 20. The device features an audible alert 140 for pet safety, a charging port 145 connected to a rechargeable battery 150, and a health sensor 155 for detecting potential health concerns. A power cord 158 supplies energy to the base unit 20, while a ramp 160 aids in the mobile unit's docking process. The device further includes a second GPS receiver 170, a second telemetry transmitter 175, a local control panel 180, a power supply 185, a first microcontroller 190, a charge controller 195, a second microcontroller 200, and a waterproof barrier 205 to protect internal components. This embodiment ensures seamless operation by integrating all the aforementioned elements, providing a fully automated and efficient pet waste management solution.

3. Operation of the Preferred Embodiment

The preferred embodiment of the present invention can be utilized by the common user 75 in a simple and effortless manner with little or no training. It is envisioned that the device 10 would be constructed in general accordance with FIG. 1 through FIG. 5. The user 75 would procure the device 10 from conventional procurement channels such as pet supply stores, discount stores, department stores, home improvement stores, mail order and internet supply houses and the like.

After procurement and prior to utilization, the mobile unit 15 and the base unit 20 would be placed in the approximate yard area 235 of use. The base unit 20 would be connected to a suitable source of power via the power cord 158. The software application would be loaded onto the wireless device 65. The collar transmitter 80 would be attached to the collar of the pet 30; and the device 10 would be activated. The device 10 would be trained to recognize the pet 30 producing droppings 35. The device 10 would be capable of recognizing multiple pet 30. At this point in time, the device 10 is ready for use.

During utilization, the mobile unit 15 would monitor the yard area 25 and track location of the pet 30 via the collar transmitter 80. Upon detection of the presence of droppings 35 via the machine vision system camera 105 and/or the methane sensor 110, the location would be logged by the first microcontroller 190 using coordinates from the dual track drive system 90. The timer, internal to the software of the second microcontroller 200, would be activated for that location. Additional parameters as provided by the ambient air temperature 115 and the moisture sensor 120 would be used to produce a calculated time interval. At the completion of the interval, the mobile unit 15 would return to the location of the droppings 35 and collect it using the scoop 125 to direct the droppings 35 to the conveyor belt 135 for subsequent placement into the temporary hopper 130. At this point, the health sensor 155 would analyze the droppings 35. Any abnormalities would be reported via the first GPS receiver 95 to the second telemetry transmitter 175 and ultimately to the wireless device 65, such that the authorized user 75 may take appropriate action. Next, the mobile unit 15 returns to the base unit 20, as guided by the GPS RF signal 45, and ascends the ramp 160. Once positioned, the temporary hopper 130 is emptied into the holding bin 165. Additionally, the charging port 145 provides for recharging of the rechargeable battery 150 to allow for repeated use.

After use, the device 10 once again monitors for the presence of yard area 25 for additional droppings 35 in a repeating and cyclical manner. The holding bin 165 would be emptied by the user 75 on a periodic basis as needed.

During use of the mobile unit 15 in the "walk-along" mode, the user 75 would activate the "walk-along" mode using the wireless device 65. The second microcontroller 200 then instructs the mobile unit 15 to immediately pickup any droppings 35 using the scoop 125 and temporary hopper 130. These droppings 35 would then be deposited in the base unit 20 when the "walk-along" mode is completed. Said "walk-along" mode is envisioned to be utilized in neighborhood walks, pet parks, while camping or hiking, at homes of family or friends, when on vacation, or anywhere outside of the yard area 25.

It is envisioned that the features of the present invention provide the following benefits: automatic operation; detection of various diseases via presence in droppings 35, reduction of unsanitary conditions, ease of use, and general favorable usage and environmental conditions.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A pet dropping retrieval and disposal device, comprising:
    a mobile unit configured to navigate a yard area, the mobile unit including:
        a dual track drive system for locomotion;
        a first GPS receiver configured to receive location data from a GPS satellite array;
        a collar receiver configured to communicate with a collar transmitter worn by a pet to track the pet's location;
        a machine vision system camera for visual detection of pet droppings;
        a methane sensor for detecting methane gas emanating from pet droppings;
        an ambient air temperature sensor and a moisture sensor for determining drying conditions of pet droppings;
        a scoop configured to collect pet droppings;
        a conveyor belt for transferring collected droppings to a temporary hopper;
        an audible alert for deterring the pet from interfering with the retrieval process;
        a health sensor configured to analyze collected droppings for potential health concerns;
        a rechargeable battery for powering the mobile unit;
        a charging port for recharging the rechargeable battery; and,
        a waterproof barrier for protecting internal electronic components; and,
    a base unit configured to communicate with the mobile unit, the base unit including:
        a second GPS receiver and a second telemetry transmitter for communication with the mobile unit;
        a ramp for the mobile unit to ascend and empty the temporary hopper into a holding bin;
        a power cord and power supply for powering the base unit and recharging the mobile unit's battery; and,
        a local control panel for manual operation of the device.

2. The pet dropping retrieval and disposal device of claim 1, wherein the mobile unit further comprises a second microcontroller configured to process input signals from the methane sensor, machine vision system camera, ambient air temperature sensor, moisture sensor, and health sensor to determine droppings' location and drying status.

3. The pet dropping retrieval and disposal device of claim 1, wherein the mobile unit is further configured to operate in a walk-along mode, wherein it immediately collects droppings using the scoop and temporary hopper while the user walks the pet.

4. The pet dropping retrieval and disposal device of claim 1, wherein the health sensor detects pathogens including Campylobacteriosis, *Salmonella*, *E. coli*, and *Giardia* and transmits results to a wireless device via telemetry signals.

5. The pet dropping retrieval and disposal device of claim 1, wherein the base unit includes a holding bin for collected droppings, the holding bin configured for periodic emptying by a user.

6. The pet dropping retrieval and disposal device of claim 1, wherein the device is operable via a wireless device configured to receive real-time telemetry data from the base unit.

7. The pet dropping retrieval and disposal device of claim 1, wherein the mobile unit is shaped to resemble a pet, and its size is adjustable for compatibility with different pet sizes.

8. The pet dropping retrieval and disposal device of claim 1, wherein the waterproof barrier is removable to facilitate cleaning of the mobile unit.

9. The pet dropping retrieval and disposal device of claim 1, further comprising a charge controller within the base unit configured to regulate power delivery to the mobile unit's rechargeable battery.

\* \* \* \* \*